United States Patent
Hanaoka

(10) Patent No.: US 11,336,323 B2
(45) Date of Patent: May 17, 2022

(54) FRONT-END MODULE AND COMMUNICATION DEVICE

(71) Applicant: Murata Manufacturing Co., Ltd., Kyoto (JP)

(72) Inventor: Kunitoshi Hanaoka, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/320,588

(22) Filed: May 14, 2021

(65) Prior Publication Data

US 2021/0273673 A1    Sep. 2, 2021

Related U.S. Application Data

(63) Continuation of application No. PCT/JP2019/049123, filed on Dec. 16, 2019.

(30) Foreign Application Priority Data

Dec. 18, 2018   (JP) .............................. JP2018-236498

(51) Int. Cl.
*H04B 1/44*    (2006.01)
*H04B 1/52*    (2015.01)

(52) U.S. Cl.
CPC ................. *H04B 1/44* (2013.01); *H04B 1/52* (2013.01)

(58) Field of Classification Search
CPC .......... H04B 1/44; H04B 1/52; H04B 1/0057; H04B 1/0053; H04B 1/006
See application file for complete search history.

(56) References Cited

U.S. PATENT DOCUMENTS

2009/0180403 A1* 7/2009 Tudosoiu ............... H04B 1/406
                                                                370/278
2014/0125428 A1   5/2014 Iwaki
(Continued)

FOREIGN PATENT DOCUMENTS

| JP | 2014096671 A | 5/2014 |
| JP | 2015029233 A | 2/2015 |
| WO | 2018061782 A1 | 4/2018 |

OTHER PUBLICATIONS

International Search Report issued in Application No. PCT/JP2019/049123, dated Mar. 3, 2020.
(Continued)

*Primary Examiner* — Tuan Pham
(74) *Attorney, Agent, or Firm* — Pearne & Gordon LLP

(57) ABSTRACT

A front-end module includes: a switch module that performs CA for bands A and C and performs non-CA for band B, which is located between these two bands, and that has a common terminal and selection terminals; a duplexer that is connected to the selection terminal and allows band A to pass therethrough; a duplexer that is connected to the selection terminal and allows band C to pass therethrough; an impedance matching network that is connected to the selection terminal; and a reception filter that is connected to the impedance matching network and allows band B to pass therethrough. During CA for bands A and C, a first circuit, which includes the impedance matching network and the reception filter, forms an attenuation pole in the frequency band of band C in the transmission characteristic of a path connecting the duplexer, the common terminal, and the duplexer to each other.

20 Claims, 4 Drawing Sheets

(56) References Cited

U.S. PATENT DOCUMENTS

| | | |
|---|---|---|
| 2015/0028963 A1 | 1/2015 | Ebihara et al. |
| 2017/0093552 A1* | 3/2017 | Zhang .................. H04L 5/14 |
| 2019/0181907 A1* | 6/2019 | Pfann .................. H03H 9/584 |
| 2019/0214959 A1 | 7/2019 | Nosaka |

OTHER PUBLICATIONS

Written Opinion issued in Application No. PCT/JP2019/049123, dated Mar. 3, 2020.

* cited by examiner

FRONT-END MODULE AND COMMUNICATION DEVICE

CROSS REFERENCE TO RELATED APPLICATIONS

This is a continuation of International Application No. PCT/JP2019/049123 filed on Dec. 16, 2019 which claims priority from Japanese Patent Application No. 2018-236498 filed on Dec. 18, 2018. The contents of these applications are incorporated herein by reference in their entireties.

BACKGROUND

Technical Field

The present disclosure relates to a front-end module that processes radio-frequency signals and to a communication device.

In recent years, mobile terminals have been required to handle a plurality of frequency bands (communication bands) and wireless systems (multiple bands and multiple modes) and therefore the front-end modules of such mobile terminals are required to process a plurality of transmission/reception signals at high speed without necessarily degradation of quality.

Patent Document 1 discloses a switching device and a module that have improved isolation characteristics between two paths (between a transmission path and a reception path) used for transmission and reception of radio-frequency signals of specific frequency bands. More specifically, a delay line is connected between two input/output terminals in a configuration in which one path is selected from among two paths as a signal path, and as a result a signal that leaks from one path to the other path is canceled out.

Patent Document 1: Japanese Unexamined Patent Application Publication No. 2014-96671

BRIEF SUMMARY

However, the above-described switching device of the related art is used in a system in which always one signal path is selected from among two signal paths and then used for transmission of a signal.

In contrast, radio-frequency signals of a plurality of communication bands are simultaneously transmitted in a front-end module used in a system in which a so-called carrier aggregation (CA) method is used in which signals of different communication bands are simultaneously communicated. A configuration in which a delay line is directly connected between a plurality of signal paths that are simultaneously used, such as the configuration of the switching device of the related art is unsuitable for ensuring desired performance in terms of the isolation characteristic (cross isolation) between a plurality of communication bands used during CA operation. In addition, in a front-end module having not only a mode in which two communication bands are used in a CA operation but also a mode in which a communication band located in the vicinity of these two communication bands is used in a non-CA operation, switches for switching between signal paths for these communication bands are needed.

However, although isolation during non-CA can be ensured through the isolation performance of the switch, cross isolation during CA is not sufficiently ensured by simply strengthening the isolation performance of the switch itself since two signal paths are simultaneously connected inside the switch.

Accordingly, the present disclosure aims to solve the above-described problem and to provide a front-end module and communication device that can ensure good cross isolation during CA in a system in which both CA and non-CA are used.

An aspect of the present disclosure provides a front-end module that includes: a switch module that has a common terminal, a first selection terminal, a second selection terminal, and a third selection terminal, and that switches a first connection between the common terminal and the first selection terminal, a second connection between the common terminal and the second selection terminal, and a third connection between the common terminal and the third selection terminal; a first filter that is connected to the first selection terminal and allows a radio-frequency signal of a first communication band to pass therethrough; a second filter that is connected to the second selection terminal and allows a radio-frequency signal of a second communication band to pass therethrough; a first impedance matching network that is connected to the third selection terminal; and a third filter that is connected to the first impedance matching network and allows a radio-frequency signal of a third communication band to pass therethrough. The second communication band is a communication band that is a different frequency band from the first communication band. The third communication band is a communication band that is a frequency band located between the first communication band and the second communication band, and that is contiguous with or partially overlaps the second communication band. The switch module is capable of switching between a first state in which the first connection and the second connection are simultaneously formed and the third connection is not formed and a second state in which the third connection is formed and the first connection and the second connection are not formed. When the switch module is in the first state, a first circuit, which includes the third selection terminal, the first impedance matching network, and the third filter, forms an attenuation pole in the frequency band of the second communication band in a transmission characteristic of a path connecting the second filter, the second selection terminal, the common terminal, the first selection terminal, and the first filter to each other.

In addition, an aspect of the present disclosure provides a front-end module that includes: a switch module that has a common terminal, a first selection terminal, a second selection terminal, and a third selection terminal, and that switches a first connection between the common terminal and the first selection terminal, a second connection between the common terminal and the second selection terminal, and a third connection between the common terminal and the third selection terminal; a first filter that is connected to the first selection terminal and allows a radio-frequency signal of a first communication band to pass therethrough; a second filter that is connected to the second selection terminal and allows a radio-frequency signal of a second communication band to pass therethrough; a first impedance matching network that is connected to the third selection terminal; and a third filter that is connected to the first impedance matching network and allows a radio-frequency signal of a third communication band to pass therethrough. The second communication band is a communication band that is a different frequency band from the first communication band. The third communication band is a communication band that is a frequency band located between the first communication band and the second communication band, and that is contiguous with or partially overlaps the second communication band. The switch module is capable of switching between a first state in which the first connection and the second connection are simultaneously formed and the third connection is not formed and a second state in which the third connection is formed and the first connection and the second connection are not formed. When the switch module is in the first state, the second selection terminal and the third selection terminal are capacitively coupled with each other.

According to the front-end module or a communication device of the present disclosure, good cross isolation can be ensured during CA in a system that uses both CA and non-CA.

DETAILED DESCRIPTION

Figure 1:
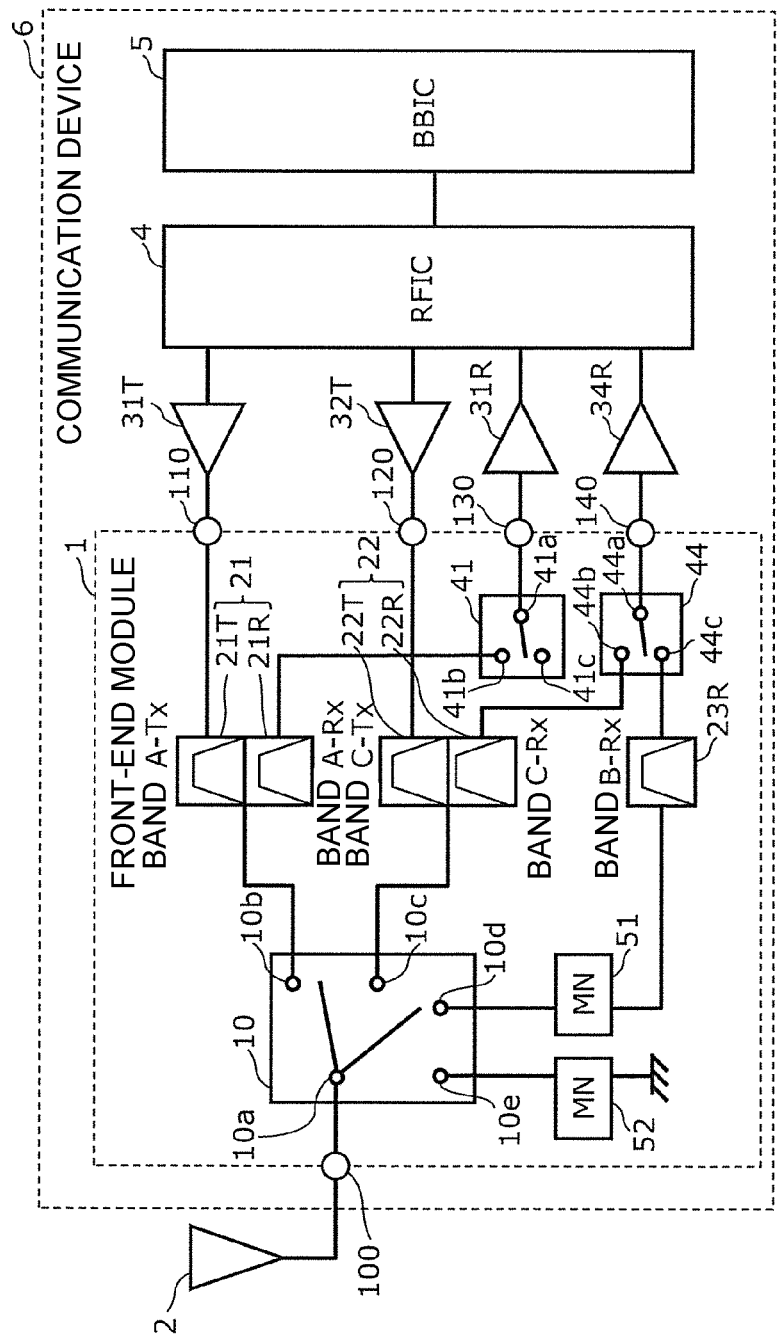
FIG. 1 is a circuit configuration diagram of a front-end module and a communication device according to an embodiment.

Hereafter, an embodiment of the present disclosure will be described in detail using the drawings. The embodiment described hereafter illustrates a comprehensive or specific example of the present disclosure. The numerical values, shapes, materials, constituent elements, arrangement of the constituent elements, the ways in which the constituent elements are connected to each other and so forth given in the following embodiment are merely examples and are not intended to limit the present disclosure. Constituent elements not described in the independent claims among constituent elements in the following embodiment are described as optional constituent elements. In addition, the sizes or size ratios between the constituent elements illustrated in the drawings are not necessarily strictly accurate.

Embodiment

Configurations of Front-End Module and Communication Device

FIG. 1 is a circuit configuration diagram of a front-end module 1 and a communication device 6 according to an embodiment. In this figure, an antenna 2, which is connected to the communication device 6, is also illustrated. The communication device 6 includes the front-end module 1, transmission amplifiers 31T and 32T, reception amplifiers 31R and 34R, RF signal processing circuit (RFIC) 4, and a baseband signal processing circuit (BBIC) 5.

The RFIC 4 is an RF signal processing circuit that processes radio-frequency signals transmitted and received by the antenna 2. Specifically, the RFIC 4 subjects a radio-frequency reception signal input thereto from the antenna 2 via the front-end module 1 and the reception amplifier 31R or 34R to signal processing using down conversion and so forth and outputs a reception signal generated through this signal processing to the BBIC 5. In addition, the RFIC 4 outputs a radio-frequency transmission signal that has been processed on the basis of a signal input from the BBIC 5 to the transmission amplifier 31T or 32T and the front-end module 1.

The BBIC 5 is a circuit that performs data processing using a signal having a lower frequency than the radio-frequency signals that propagate through the front-end module 1. A signal processed by the BBIC 5 is, for example, used as an image signal for image display or as an audio signal for a telephone call. The RFIC 4 and the BBIC 5 are, for example, formed as IC's.

The front-end module 1 is a multi-carrier transmission/reception device that is provided with a plurality of signal paths for transmitting and receiving wireless signals using a plurality of communication bands (frequency bands) in order to support multiple modes/multiple bands. The front-end module 1 includes a switch module 10, duplexers 21 and 22, a reception filter 23R, impedance matching networks 51 and 52, switches 41 and 44, an external connection terminal 100, transmission input terminals 110 and 120, and reception output terminals 130 and 140. The front-end module 1 is arranged in the front end of a mobile phone that supports multiple modes/multiple bands, for example.

The external connection terminal 100 is a terminal that is connected to the antenna 2. The external connection terminal 100 may instead be connected to a device or circuit that transmits a radio-frequency signal rather than the antenna 2. The transmission input terminals 110 and 120 are terminals for inputting radio-frequency transmission signals to the front-end module 1. Furthermore, the reception output terminals 130 and 140 are terminals for outputting radio-frequency reception signals from the front-end module 1. The transmission input terminal 110 is connected to a transmission filter 21T and the transmission amplifier 31T. The transmission input terminal 120 is connected to a transmission filter 22T and the transmission amplifier 32T. The reception output terminal 130 is connected to the switch 41 and the reception amplifier 31R. The reception output terminal 140 is connected to the switch 44 and the reception amplifier 34R.

The switch module 10 has a common terminal 10a, a selection terminal 10b (first selection terminal), a selection terminal 10c (second selection terminal), a selection terminal 10d (third selection terminal), and a selection terminal 10e (fourth selection terminal). In this configuration, the switch module 10 switches a connection between the common terminal 10a and the selection terminal 10b (hereafter, first connection), a connection between the common terminal 10a and the selection terminal 10c (hereafter, second connection), a connection between the common terminal 10a and the selection terminal 10d (hereafter, third connection), and a connection between the common terminal 10a and the selection terminal 10e (hereafter, fourth connection). Here, the switch module 10 is able to simultaneously form the first connection and the second connection and is able to simultaneously form the third connection and the fourth connection.

The switch module 10 may, for example, be formed of a single pole single throw (SPST) switch element that switches between connecting and disconnecting the common terminal 10a and the selection terminal 10b, an SPST switch element that switches between connecting and disconnecting the common terminal 10a and the selection terminal 10c, an SPST switch element that switches between connecting and disconnecting the common terminal 10a and the selection terminal 10d, and an SPST switch element that switches between connecting and disconnecting the common terminal 10a and the selection terminal 10e.

The switch elements constituting the switch module 10 may be field effect transistor (FET) switches or diode switches composed of GaAs or a complementary metal oxide semiconductor (CMOS), for example. Since such switches are small in size, the front-end module 1 according to this embodiment can be reduced in size.

The duplexer 21 is a first filter that is connected to the selection terminal 10b and allows radio-frequency signals of band A (first communication band) to pass therethrough and that includes the transmission filter 21T and a reception filter 21R. The transmission filter 21T is a first transmission filter that has an output terminal that is connected to the selection terminal 10b and an input terminal that is connected to the transmission input terminal 110 and that allows a radio-frequency signal of a transmission band of band A to pass therethrough. The reception filter 21R is a first reception filter that has an input terminal that is connected to the selection terminal 10b and an output terminal that is connected to the switch 41 and that allows a radio-frequency signal of a reception band of band A to pass therethrough.

The duplexer 22 is a second filter that is connected to the selection terminal 10c and allows radio-frequency signals of band C (second communication band) to pass therethrough and that includes the transmission filter 22T and a reception filter 22R. The transmission filter 22T is a second transmission filter that has an output terminal that is connected to the selection terminal 10c and an input terminal that is connected to the transmission input terminal 120 and that allows a radio-frequency signal of a transmission band of band C to pass therethrough. The reception filter 22R is a second reception filter that has an input terminal that is connected to the selection terminal 10c and an output terminal that is connected to the switch 44 and that allows a radio-frequency signal of a reception band of band C to pass therethrough.

The front-end module 1 according to this embodiment may include only the transmission filter 21T of the duplexer 21. In this case, the reception filter 21R, the switch 41, the reception output terminal 130, and the reception amplifier 31R are not required. In addition, the front-end module 1 may include only the reception filter 22R of the duplexer 22. In this case, additionally, the transmission filter 22T, the transmission input terminal 120, and the transmission amplifier 32T are not required.

In addition, the front-end module 1 according to this embodiment may include only the reception filter 21R of the duplexer 21. In this case, the transmission filter 21T, the transmission input terminal 110, and the transmission amplifier 31T are not required. In addition, the front-end module 1 may include only the transmission filter 22T of the duplexer 22. In this case, additionally, the reception filter 22R and the switch 44 are not required.

The reception filter 23R is a third filter that has an input terminal that is connected to the selection terminal 10d via the impedance matching network 51 and an output terminal that is connected to the switch 44 and that allows a radio-frequency signal of band B (third communication band) to pass therethrough. In this embodiment, the reception filter 23R is a reception filter having band B as a reception band.

In this embodiment, for example, Band 3 (transmission band: 1710-1785 MHz, reception band: 1805-1880 MHz) of Long Term Evolution (LTE) is used as band A (first communication band). In addition, for example, Band 1 (transmission band: 1920-1980 MHz, reception band: 2110-2170 MHz) of LTE is used as band C (second communication band). Furthermore, for example, Band 39 (transmission/reception band: 1880-1920 MHz) of LTE is used as band B (third communication band).

The impedance matching network 51 is a first impedance matching network that is connected to the selection terminal 10d. The impedance matching network 51 is, for example, formed of at least one out of an inductor and a capacitor, and may be serially arranged on a path connecting the selection terminal 10d and the reception filter 23R as illustrated in FIG. 1 or may be arranged between a node on that path and ground (parallel arrangement) or both a series arrangement and a parallel arrangement may be adopted.

The impedance matching network 52 is a second impedance matching network that is connected to a path connecting the selection terminal 10e and ground. The impedance matching network 52 is, for example, formed of at least one out of an inductor and a capacitor.

The selection terminal 10e and the impedance matching network 52 are optional constituent elements of the front-end module 1 according to the present disclosure. The impedance matching network 52 is arranged for the purpose of compensating for degradation of transmission loss along a signal path of band B including the common terminal 10a, the selection terminal 10d, the impedance matching network 51, and the reception filter 23R in the case where band B alone is used (non-CA case). However, if the impedance matching network 51 does not affect degradation of transmission loss in the signal path of band B during non-CA for band B, the impedance matching network 52 and the selection terminal 10e are not required.

The transmission amplifier 31T is a first power amplifier that has an input terminal that is connected to the RFIC 4 and an output terminal that is connected to the transmission input terminal 110 and preferentially amplifies a radio-frequency transmission signal of band A. The transmission amplifier 32T is a second power amplifier that has an input terminal that is connected to the RFIC 4 and an output terminal that is connected to the transmission input terminal 120 and preferentially amplifies a radio-frequency transmission signal of band C.

The reception amplifier 31R is a first low-noise amplifier that has an input terminal that is connected to the output terminal of the reception filter 21R via the reception output terminal 130 and the switch 41, has an output terminal that is connected to the RFIC 4, and preferentially amplifies a radio-frequency reception signal of band A. The reception amplifier 34R is a second low-noise amplifier that has an input terminal that is connected to the output terminal of the reception filter 22R via the reception output terminal 140 and the switch 44, has an output terminal that is connected to the RFIC 4, and preferentially amplifies a radio-frequency reception signal of band C. In addition, the input terminal of the reception amplifier 34R is connected to the output terminal of the reception filter 23R via the reception output terminal 140 and the switch 44 and the reception amplifier 34R preferentially amplifies a radio-frequency reception signal of band B.

The switch 41 is a first switch that is arranged on a path connecting the reception filter 21R and the reception amplifier 31R. More specifically, the switch 41 has a common terminal 41a and selection terminals 41b and 41c, and the common terminal 41a is connected to the reception output terminal 130 and the selection terminal 41b is connected to the output terminal of the reception filter 21R. With this configuration, the switch 41 switches between connecting and disconnecting the reception filter 21R and the reception amplifier 31R to and from each other.

The switch 44 is a second switch that is arranged on a path connecting the reception filter 22R and the reception amplifier 34R. More specifically, the switch 44 has a common terminal 44a and selection terminals 44b and 44c, and the common terminal 44a is connected to the reception output terminal 140, the selection terminal 44b is connected to the output terminal of the reception filter 22R, and the selection terminal 44c is connected to the output terminal of the reception filter 23R. With this configuration, the switch 44 switches the connection between the reception filter 22R and the reception amplifier 34R and the connection between the reception filter 23R and the reception amplifier 34R.

The output terminal of the reception filter 23R may be connected to the selection terminal 41c rather than the selection terminal 44c. In this case, a radio-frequency signal of band B that passes through the reception filter 23R is amplified by the reception amplifier 31R rather than the reception amplifier 34R.

Band B is adjacent to bands A and C and therefore a radio-frequency signal of band B can be amplified using either the reception amplifier 31R, which preferentially amplifies a radio-frequency signal of band A or the reception amplifier 34R, which preferentially amplifies a radio-frequency signal of band C. As a result, since an amplifier that amplifies a radio-frequency signal of band B can be an amplifier that amplifies a radio-frequency signal of band A or C, the front-end module 1 can be reduced in size.

Figure 2:
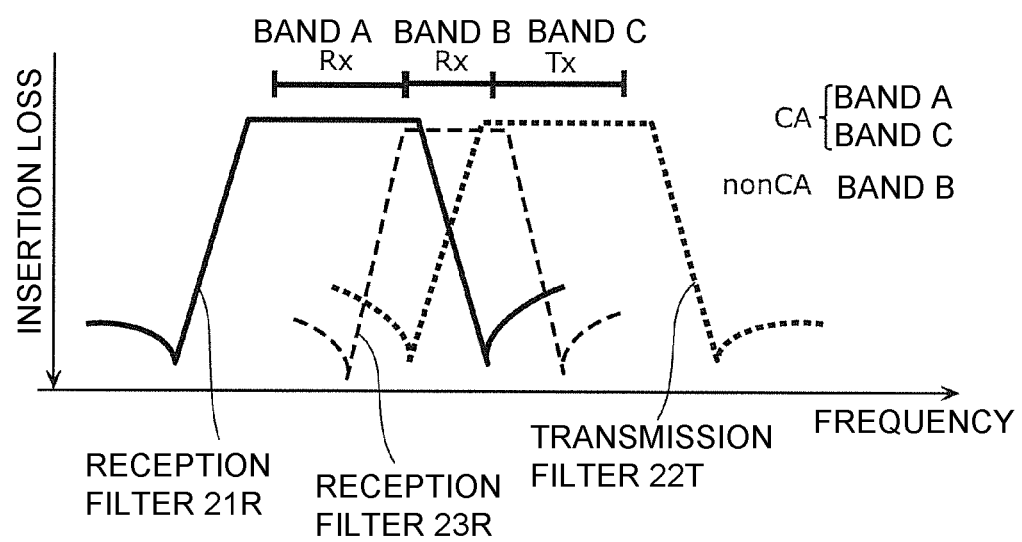
FIG. 2 is a diagram illustrating the relationship between the frequencies of the communication bands used in the front-end module according to the embodiment.

FIG. 2 is a diagram illustrating the relationship between the frequencies of the communication bands used in the front-end module 1 according to the embodiment. The figure illustrates the rough bandpass characteristics of the reception filter 21R, the reception filter 23R, and the transmission filter 22T, and the frequency relationship between band A (reception band), band B (reception band), and band C (transmission band). Note that a transmission band of band A (and rough bandpass characteristic of transmission filter 21T) and a reception band of band C (and rough bandpass characteristic of reception filter 22R) are not illustrated in FIG. 2. The transmission band of band A is located at lower frequency than the reception band of band A and the reception band of band C is located at a higher frequency than the transmission band of band C.

Here, band A (first communication band) and band C (second communication band) are different frequency bands. In addition, band B (third communication band) is a frequency band that is located between band A (first communication band) and band C (second communication band), and is contiguous with or partially overlaps band C (second communication band). In this embodiment, as illustrated in FIG. 2, band B (third communication band) is a frequency band located between band A (first communication band) and band C (second communication band) and is contiguous with both band A (first communication band) and band C (second communication band).

In the front-end module 1 and the communication device 6 having the above-described configurations and frequency relationships, a method is used in which (1) communication is performed by simultaneously using a radio-frequency signal of band A (first communication band) and a radio-frequency signal of band C (second communication band) and (2) communication is performed using a radio-frequency signal of band B (third communication band) alone without necessarily simultaneously using radio-frequency signals of bands A and C.

Circuit Operation of Front-End Module

Figure 3A:
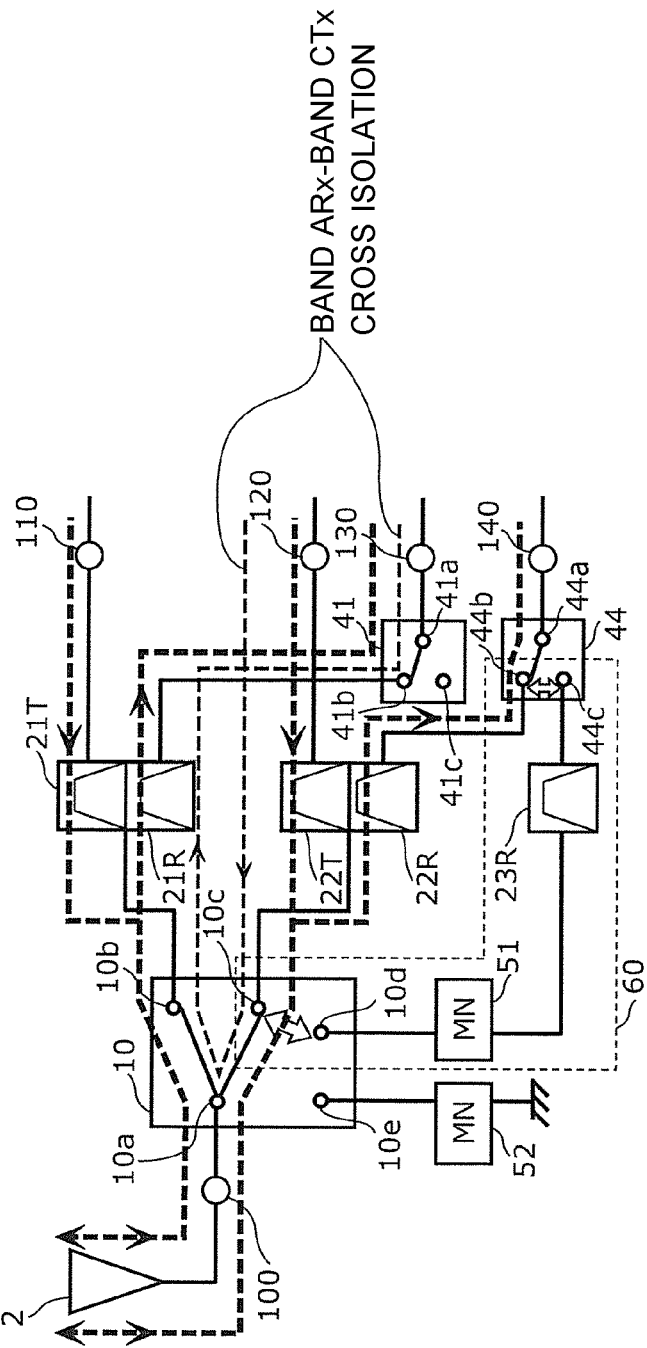
FIG. 3A is a diagram illustrating the circuit state of the front-end module according to the embodiment during CA.
Figure 3B:
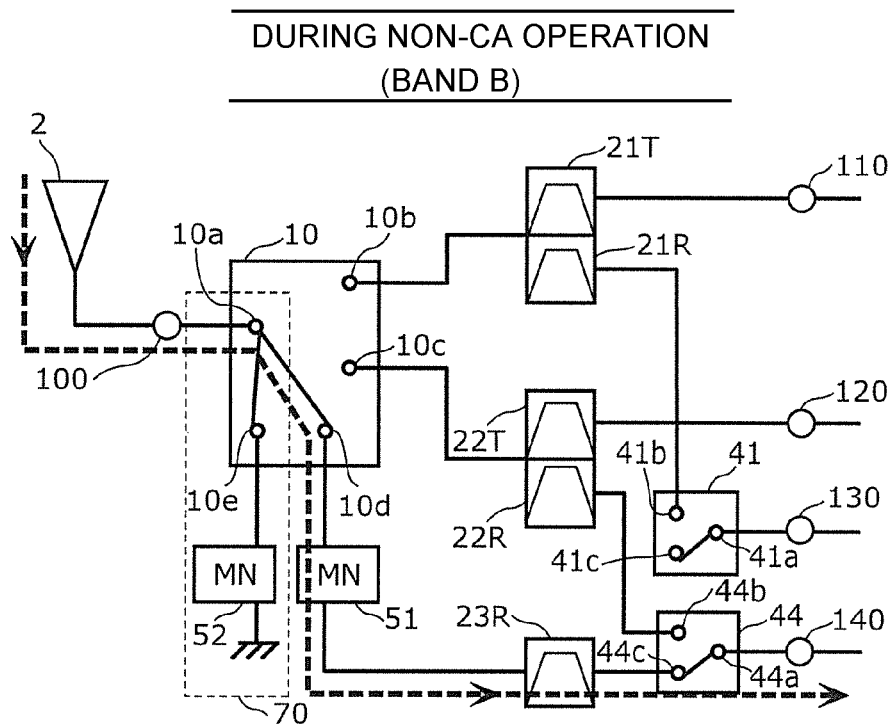
FIG. 3B is a diagram illustrating the circuit state of the front-end module according to the embodiment during non-CA.

FIG. 3A is a diagram illustrating the circuit state of the front-end module 1 according to the embodiment during CA. Furthermore, FIG. 3B is a diagram illustrating the circuit state of the front-end module 1 according to the embodiment during non-CA.

First, as illustrated in FIG. 3A, the front-end module 1 according to this embodiment (1) performs communication by simultaneously using a radio-frequency signal of band A (first communication band) and a radio-frequency signal of band C (second communication band). The figure illustrates the circuit connection state and signal flows in the case where CA for band A transmission and band C transmission (two uplink channels) and CA for band A reception and band C reception (two downlink channels) are performed.

As illustrated in FIG. 3A, the common terminal 10a and the selection terminal 10b of the switch module 10 are connected to each other and the common terminal 10a and the selection terminal 10c of the switch module 10 are connected to each other during CA for band A and band C. In addition, the common terminal 10a is not connected to the selection terminals 10d and 10e. In other words, in the case where communication is performed by simultaneously using a radio-frequency signal of band A and a radio-frequency signal of band C, the first connection and the second connection are simultaneously formed and the third connection and the fourth connection are not formed (first state). In addition, in the switch 41, the common terminal 41a and the selection terminal 41b are connected to each other and the common terminal 41a and the selection terminal 41c are not connected to each other. In addition, in the switch 44, the common terminal 44a and the selection terminal 44b are connected to each other and the common terminal 44a and the selection terminal 44c are not connected to each other.

In the case where band A or band C is used alone (during non-CA), isolation of the radio-frequency signals of these bands can be secured via the isolation performance between the individual selection terminals of the switch module 10. In contrast, during CA for band A and band C, two signal paths are simultaneously connected inside the switch module 10, and therefore cross isolation between band A and band C is not sufficiently secured by simply strengthening the isolation performance of the switch module 10 itself.

With respect to this, in the front-end module 1 according to this embodiment, an attenuation pole is generated in the frequency band of band C in the cross isolation characteristic between a radio-frequency signal of band A and a radio-frequency signal of band C by a first circuit 60 including the selection terminal 10d, the impedance matching network 51, and the reception filter 23R during CA for band A and band C.

More specifically, in a state where the first connection and the second connection are simultaneously formed and the third connection and the fourth connection are not formed during CA for band A and band C, the selection terminal 10c and the selection terminal 10d are electrically connected to each other via a parasitic capacitance formed between the selection terminal 10c and the selection terminal 10d. In other words, for example, the cross isolation characteristic between band C (transmission band) and band A (reception band) is defined by the transmission characteristic of the path: transmission input terminal 120→transmission filter 22T→selection terminal 10c→common terminal 10a→selection terminal 10b→reception filter 21R→selection terminal 41b→common terminal 44a→reception output terminal 140, and the first circuit 60 is capacitively coupled to this path.

Figure 4:
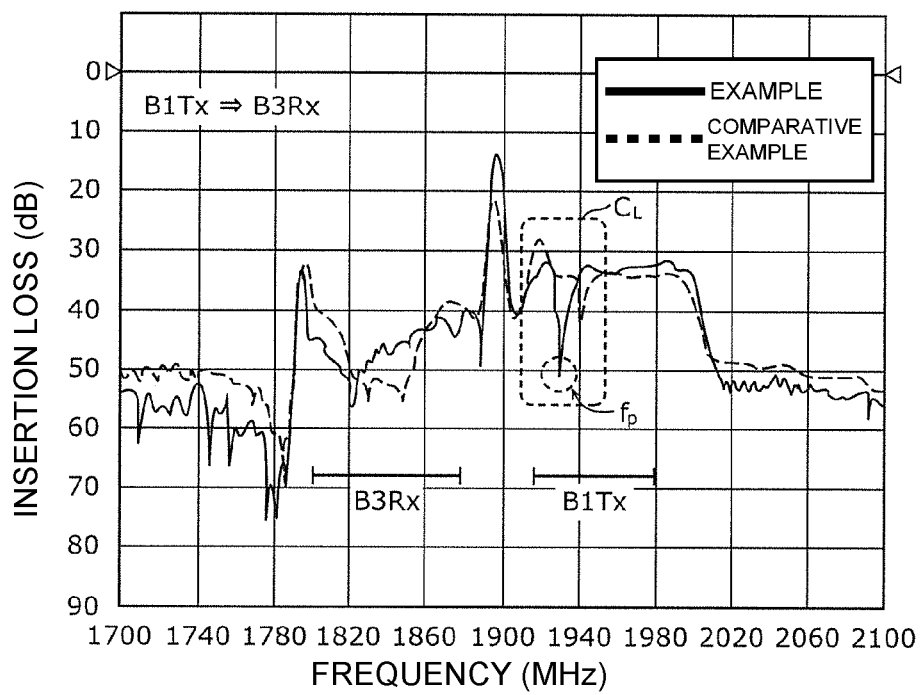
FIG. 4 is a graph illustrating cross isolation characteristics of front-end modules according to an example and a comparative example.

FIG. 4 is a graph illustrating cross isolation characteristics of front-end modules according to an example and a comparative example. In the figure, the front-end module according to the example is a front-end module realized by using Band 3 of LTE as the first communication band, Band 1 of LTE as the second communication band, and Band 39 of LTE as the third communication band in the front-end module 1 according to the embodiment. In addition, for example, a circuit in which an inductor (1.8 nH) is serially connected along a path connected between the selection terminal 10d and the reception filter 23R and a capacitor (1.8 pF) that is connected in parallel between ground and a node on a path connected between the inductor and the selection terminal is used as the impedance matching network 51. On the other hand, the impedance matching network 51 in the front-end module of the example is not added to the front-end module according to the comparative example.

As illustrated in FIG. 4, in the cross isolation characteristic of the front-end module according to the comparative example (transmission characteristic of transmission input terminal 120→transmission filter 22T→selection terminal 10c→common terminal 10a→selection terminal 10b→reception filter 21R→selection terminal 41b→common terminal 44a→reception output terminal 140), isolation of 30 dB or more is mostly ensured in Band 3 Rx (reception band of first communication band) and Band 1 Tx (transmission band of second communication band). However, the isolation is less than 30 dB in a low-frequency-side band $C_L$ of Band 1 Tx.

In contrast, in the cross isolation characteristic of the front-end module according to the example (transmission characteristic defined by the path: transmission input terminal 120→transmission filter 22T→selection terminal 10c→common terminal 10a→selection terminal 10b→reception filter 21R→selection terminal 41b→common terminal 44a→reception output terminal 140), isolation of 30 dB or higher is ensured in the entirety of Band 3 Rx (reception band of first communication band) and Band 1 Tx (transmission band of second communication band). Isolation is particularly improved in the low-frequency-side band $C_L$ of Band 1 Tx compared to the comparative example.

A reason for the cross-isolation being improved in the band $C_L$ in the front-end module according to the example compared with the comparative example is due to the operation of the first circuit 60, which is capacitively coupled to the selection terminal 10c. More specifically, since the first circuit 60 is a composite circuit including the reception filter 23R whose pass band is Band B, which is next to Band C, and the impedance matching network 51, the first circuit 60 can form an attenuation pole fp in the frequency band (particularly low frequency side) of Band C (second communication band) in the transmission characteristic of the path defining the cross isolation. Thus, during CA for band A and band C, the attenuation pole fp is generated in the frequency band of Band 1 (second communication band) in the cross isolation characteristic between Band 3 (first communication band) and Band 1 (second communication band) by the first circuit 60, which is electrically connected to the selection terminal 10c via the parasitic capacitance. Therefore, the cross isolation characteristic between Band 3 (first communication band) and Band 1 (second communication band) can be improved.

The distance between the selection terminal 10c and the selection terminal 10d may be smaller than the distance between the common terminal 10a and the selection terminal 10c. With this configuration, the distance between the selection terminal 10c and the selection terminal 10d is relatively small compared to the distance between the common terminal 10a and the selection terminal 10c, and therefore it can be ensured that the value of the parasitic capacitance (off capacitance) formed between the selection terminal 10c and the selection terminal 10d is large. Thus, the frequency and impedance of the attenuation pole fp formed by the first circuit 60 during CA for band A and band C can be adjusted over a wide range and it is possible to improve the degree of freedom with which the cross isolation characteristic between band A and band C can be adjusted.

In addition, the common terminal 44a and the selection terminal 44b are connected to each other and the common terminal 44a and the selection terminal 44c are not connected to each other in the switch 44 during CA for band A and band C. In other words, the first circuit 60 is capacitively coupled to the selection terminal 10c, but can also capacitively couple to the selection terminal 44b. In this way, the first circuit 60 may generate the attenuation pole fp in the frequency band of band C while considering not only capacitive coupling to the selection terminal 10c but also capacitive coupling to the selection terminal 44b.

In addition, optimized results for the cross isolation characteristic between the reception band of band A and the transmission band of band C are illustrated in FIG. 4, but the cross isolation characteristic between the transmission band of band A and the reception band of band C can also be optimized in the front-end module 1 according to this embodiment using the first circuit 60.

Next, as illustrated in FIG. 3B, the front-end module 1 according to the embodiment (2) performs communication using a radio-frequency signal of band B (third communication band) alone without necessarily simultaneously using radio-frequency signals of bands A and C. The figure illustrates the circuit connection state and signal flow in the case where non-CA using reception of band B is performed.

As illustrated in FIG. 3B, the common terminal 10a and the selection terminal 10d of the switch module 10 are connected to each other and the common terminal 10a and the selection terminal 10e of the switch module 10 are connected to each other during non-CA for band B. Furthermore, the common terminal 10a is not connected to the selection terminals 10b and 10c. In other words, in the case where communication is performed using a radio-frequency signal of band B alone without necessarily simultaneously using radio-frequency signals of band A and band C, the third connection and the fourth connection are simultaneously formed and the first connection and the second connection are not formed (second state). In addition, in the switch 44, the common terminal 44a and the selection terminal 44c are connected to each other and the common terminal 44a and the selection terminal 44b are not connected to each other.

In the case where band B is used alone (during non-CA), a radio-frequency signal of band B is output from the reception output terminal 140 using a path defined as: common terminal 10a→selection terminal 10d→impedance matching network 51→reception filter 23R→selection terminal 44c→common terminal 44a. At this time, isolation between band B and bands A and C can be secured since the selection terminal 10d and the selection terminals 10b and 10c are in non-connected states. However, since the impedance matching network 51, which is suitable for securing cross isolation during CA for band A and band C, is connected along the above-described path, it is assumed that transmission loss of a radio-frequency signal of band B along the path will increase by an amount corresponding to the impedance matching network 51. In other words, it is assumed that, during non-CA for band B, the transmission characteristic of the first circuit 60 will be degraded by the impedance matching network 51, which is arranged in order to improve the cross isolation during CA for band A and band C.

Regarding this point, in the front-end module 1 according to this embodiment, a second circuit 70 including the selection terminal 10e, the impedance matching network 52, and ground eliminates the attenuation pole fp of the frequency band of band C in the transmission characteristic of the first circuit 60 or shifts the attenuation pole fp to a band other than band B during non-CA for band B.

For example, a circuit in which an inductor (4.3 nH) is connected between the selection terminal 10e and ground may be used as the second circuit 70.

With this configuration, during non-CA for band B, the attenuation pole fp of the frequency band of band C in the transmission characteristic of the first circuit 60 can be eliminated or the attenuation pole fp can be shifted to a band other than band B by the second circuit 70 connected to the common terminal 10a. Therefore, the transmission characteristic of band B (third communication band) can be improved.

Effects and So Forth

The front-end module 1 according to this embodiment includes the switch module 10, the duplexers 21 and 22, the reception filter 23R, and the impedance matching network 51. The switch module 10 has the common terminal 10a and the selection terminals 10b to 10d and switches the first connection between the common terminal 10a and the selection terminal 10b, the second connection between the common terminal 10a and the selection terminal 10c, and the third connection between the common terminal 10a and the selection terminal 10d. The duplexer 21 is connected to the selection terminal 10b and allows a radio-frequency signal of band A to pass therethrough and the duplexer 22 is connected to the selection terminal 10c and allows a radio-frequency signal of band C to pass therethrough. The impedance matching network 51 is connected to the selection terminal 10d. The reception filter 23R is connected to the impedance matching network 51 and allows a radio-frequency signal of band B to pass therethrough. Here, band C is a communication band that is a different frequency band from band A. Band B is a communication band that is a frequency band located between band A and band C, and that is contiguous with or partially overlaps band C. The switch module 10 can switch between a first state in which the first connection and the second connection are simultaneously formed and the third connection is not formed and a second state in which the third connection is formed and the first connection and the second connection are not formed. When the switch module 10 is in the first state, the first circuit 60, which includes the selection terminal 10d, the impedance matching network 51, and the reception filter 23R, forms an attenuation pole in the frequency band of band C in the transmission characteristic of the path connecting the duplexer 22, the selection terminal 10c, the common terminal 10a, the selection terminal 10b, and the duplexer 21.

With this configuration, it is possible to (1) perform CA for band A and band C and (2) perform non-CA for band B through switching performed by the switch module 10. Here, in the case where (1) CA for band A and band C is performed, the attenuation pole fp is generated by the first circuit 60 in the frequency band of band C in the cross isolation characteristic between band A and band C, and therefore isolation can be improved for band C. Therefore, the cross isolation characteristic during CA for band A and band C can be improved in a system that uses both CA and non-CA.

In addition, the switch module 10 may further have the selection terminal 10e and may switch the first connection, the second connection, the third connection, and the fourth connection, which is between the common terminal 10a and the selection terminal 10e. The front-end module 1 may further include the impedance matching network 52 connected to a path connecting the selection terminal 10e and ground to each other.

With this configuration, although a radio-frequency signal of band B passes through the common terminal 10a and the first circuit 60 in non-CA for band B, the transmission characteristic of the first circuit 60 can be optimized using the impedance matching network 52.

Furthermore, in the switch module 10, (1) in the case of the first state, the first connection and the second connection may be simultaneously formed and the third connection and the fourth connection may not be formed and (2) in the case of the second state, the third connection and the fourth connection may be formed and the first connection and the second connection may not be formed.

With this configuration, it is possible to (1) perform CA for band A and band C and (2) perform non-CA for band B through switching performed by the switch module 10. In addition, (2) during non-CA for band B, although a radio-frequency signal of band B passes through the common terminal 10a and the first circuit 60, the transmission characteristic of the first circuit 60 can be optimized by connecting the impedance matching network 52 to the common terminal 10a.

In addition, when the switch module 10 is in the second state, the second circuit 70 including the selection terminal 10e and the impedance matching network 52 may eliminate the attenuation pole fp of band C in the transmission characteristic of the first circuit 60 or shift the attenuation pole fp to a band other than band B.

It is assumed that, during non-CA for band B, the transmission characteristic of the first circuit 60 will be degraded by the impedance matching network 51, which is arranged in order to improve the cross isolation during CA for band A and band C. With respect to this point, during non-CA for band B, the attenuation pole fp of band C can be eliminated or the attenuation pole fp can be shifted to a band other than band B by the second circuit 70 connected to the common terminal 10a, and therefore the transmission characteristic of band B can be improved.

In addition, when the switch module 10 is in the first state, the selection terminal 10c and the selection terminal 10d may be capacitively coupled.

Thus, the attenuation pole fp can be generated in the frequency band of band C in the cross isolation characteristic between band A and band C by the first circuit 60, which is electrically connected to selection terminal 10c by this capacitive coupling. Therefore, the cross isolation characteristic between band A and band C can be improved.

The distance between the selection terminal 10c and the selection terminal 10d may be smaller than the distance between the common terminal 10a and the selection terminal 10c.

With this configuration, since the distance between the selection terminal 10c and the selection terminal 10d is relatively small, a signal path of band C, which includes the duplexer 22, and the first circuit 60 can be allowed to capacitively couple with each other via a parasitic capacitance (off capacitance) formed between the selection terminal 10c and the selection terminal 10d. This enables the attenuation pole fp to be generated in the frequency band of band C in the cross isolation characteristic between band A and band C by the first circuit 60, which is capacitively coupled to the selection terminal 10c via the parasitic capacitance during CA for band A and band C. Therefore, the cross isolation characteristic between band A and band C can be improved.

In addition, the duplexer 21 may include the transmission filter 21T that has an output terminal that is connected to the selection terminal 10b and that allows a radio-frequency signal of the transmission band of band A to pass therethrough and the reception filter 21R that has an input terminal that is connected to the selection terminal 10b and that allows a radio-frequency signal of the reception band of band A to pass therethrough. The duplexer 22 may include the transmission filter 22T that has an output terminal that is connected to the selection terminal 10c and that allows a radio-frequency signal of the transmission band of band C to pass therethrough and the reception filter 22R that has an input terminal that is connected to the selection terminal 10c and that allows a radio-frequency signal of the reception band of band C to pass therethrough. The reception filter 23R may be a reception filter having band B as a reception band. When the switch module 10 is in the first state, the first circuit 60 may generate an attenuation pole in the reception band of band C in the transmission characteristic of a path connecting the reception filter 22R, the selection terminal 10c, the common terminal 10a, the selection terminal 10b and the transmission filter 21T to each other or may generate a attenuation pole in the transmission band of band C in the transmission characteristic of a path connecting the transmission filter 22T, the selection terminal 10c, the common terminal 10a, the selection terminal 10b, and the reception filter 21R to each other.

With this configuration, during CA for band A and band C, cross isolation between the transmission band of band A and the reception band of band C or cross isolation between the reception band of band A and the transmission band of band C can be improved.

In addition, the front-end module 1 may further include the reception amplifier 31R that is connected to the output terminal of the reception filter 21R and amplifies a reception signal of band A and the reception amplifier 34R that is connected to the output terminal of the reception filter 22R and amplifies a reception signal of band C. The input terminal of the reception filter 23R may be connected to the impedance matching network 51 and the output terminal of the reception filter 23R may be connected to the reception amplifier 31R or 34R.

As a result, since an amplifier that amplifies a radio-frequency signal of band B can be an amplifier that amplifies a radio-frequency signal of band A or band C, the front-end module 1 can be reduced in size.

In addition, the front-end module 1 may further include the switch 41 that is arranged along the path connecting the reception filter 21R and the reception amplifier 31R to each other and that switches between connecting and disconnecting the reception filter 21R and the reception amplifier 31R to and from each other and the switch 44 that is arranged along the path connecting the reception filter 22R and the reception amplifier 34R to each other and that switches a connection between the reception filter 22R and the reception amplifier 34R and a connection between the reception filter 23R and the reception amplifier 34R.

With this configuration, during CA for band A and band C, the attenuation pole fp is readily generated in band C in the cross isolation characteristic between band A and band C due to the first circuit 60 being electrically connected to the reception filter 22R via the parasitic capacitance of the switch 44.

In addition, band A may be Band 3 of LTE (transmission band: 1710-1785 MHz, reception band: 1805-1880 MHz), band C may be Band 1 of LTE (transmission band: 1920-1980 MHz, reception band: 2110-2170 MHz), and band B may be Band 39 of LTE (reception band: 1880-1920 MHz).

In addition, the front-end module 1 according to this embodiment includes the switch module 10, the duplexers 21 and 22, the reception filter 23R, and the impedance matching network 51. The switch module 10 has the common terminal 10a and the selection terminals 10b to 10d and switches the first connection between the common terminal 10a and the selection terminal 10b, the second connection between the common terminal 10a and the selection terminal 10c, and the third connection between the common terminal 10a and the selection terminal 10d. The duplexer 21 is connected to the selection terminal 10b and allows a radio-frequency signal of band A to pass therethrough and the duplexer 22 is connected to the selection terminal 10c and allows a radio-frequency signal of band C to pass therethrough. The impedance matching network 51 is connected to the selection terminal 10d. The reception filter 23R is connected to the impedance matching network 51 and allows a radio-frequency signal of band B to pass therethrough. Here, band C is a communication band that is a different frequency band from band A. Band B is a communication band that is a frequency band located between band A and band C, and that is contiguous with or partially overlaps band C. The switch module 10 is able to switch between the first state in which the first connection and the second connection are simultaneously formed and the third connection is not formed and the second state in which the third connection is formed and the first connection and the second connection are not formed. When the switch module 10 is in the first state, the selection terminal 10c and the selection terminal 10d are capacitively coupled with each other.

With this configuration, it is possible to (1) perform CA for band A and band C and (2) perform non-CA for band B through switching performed by the switch module 10. Here, in the case where (1) CA for band A and band C is performed, the first circuit 60 is capacitively coupled to the path: transmission filter 22T→selection terminal 10c→common terminal 10a→selection terminal 10b→reception filter 21R. Thus, the attenuation pole fp is generated in the frequency band of band C in the cross isolation characteristic between band A and band C, and therefore isolation in band C can be improved. Therefore, the cross isolation characteristic during CA for band A and band C can be improved in a system that uses both CA and non-CA.

Furthermore, the communication device 6 according to this embodiment includes the RFIC 4 that processes radio-frequency signals transmitted and received by the antenna 2; and the front-end module according to any of the above descriptions that transmits radio-frequency signals between the antenna 2 and the RFIC 4.

With this configuration, the communication device 6 can be provided that has an improved cross isolation characteristic between band A and band C.

Other Embodiments Etc.

The front-end module 1 and the communication device 6 according to an embodiment of the present disclosure have been described above in the form of an embodiment and an example, but a front-end module and a communication device of the present disclosure are not limited to the above-described embodiment and example. Other embodiments realized by combining any of the constituent elements of the above-described embodiment and example with one another, modifications obtained by modifying the above-described embodiment and example in various ways, as thought of by one skilled in the art, while not departing from the gist of the present disclosure, and various devices having the front-end module 1 and the communication device 6 of the present disclosure built thereinto are also included in the present disclosure.

For example, a case in which band A is Band 3 of LTE, band C is Band 1 of LTE, and band B is Band 39 of LTE has been exemplified in the front-end module according to the example, but the front-end module 1 according to this embodiment is not limited to this combination of communication bands. The front-end module 1 according to this embodiment can also be applied to the following combinations of communication bands, for example.

That is, the present disclosure can also be applied to a case in which band A is Band 1 of LTE, band C is Band 7 of LTE (transmission band: 2500-2570 MHz, reception band: 2620-2690 MHz), and band B is Band 41 of LTE (reception band: 2496-2690 MHz). In addition, the present disclosure can also be applied to a case in which band A is Band 3 of LTE, band C is Band 7 of LTE, and band B is Band 41 of LTE.

In addition, in the front-end modules and communication devices according to the embodiment and example described above, a different passive circuit element, a different wiring line, and so forth may be inserted midway along paths that connect the circuit elements and signal paths disclosed in the drawings.

INDUSTRIAL APPLICABILITY

The present disclosure can be broadly used in communication devices, such as mobile phones as a front-end module that supports multiple bands/multiple modes in which a carrier aggregation method is employed.

REFERENCE SIGNS LIST 1 front-end module
2 antenna
4 RF signal processing circuit (RFIC)
5 baseband signal processing circuit (BBIC)
6 communication device
10 switch module
10a, 41a, 44a common terminal
10b, 10c, 10d, 10e, 41b, 41c, 44b, 44c selection terminal
21, 22 duplexer
21R, 22R, 23R reception filter
21T, 22T transmission filter
31T, 32T transmission amplifier
31R, 34R reception amplifier
41, 44 switch
51, 52 impedance matching network
60 first circuit
70 second circuit
100 external connection terminal
110, 120 transmission input terminal
130, 140 reception output terminal

The invention claimed is:
1. A front-end module comprising:
a switch module that has a common terminal, a first selection terminal, a second selection terminal, and a third selection terminal, and that switches a first connection between the common terminal and the first selection terminal, a second connection between the common terminal and the second selection terminal, and a third connection between the common terminal and the third selection terminal;
a first filter that is connected to the first selection terminal and that allows a radio-frequency signal of a first communication band to pass therethrough;
a second filter that is connected to the second selection terminal and that allows a radio-frequency signal of a second communication band to pass therethrough;
a first impedance matching network that is connected to the third selection terminal; and
a third filter that is connected to the first impedance matching network and that allows a radio-frequency signal of a third communication band to pass therethrough;
wherein the second communication band is a frequency band that is different from the first communication band,
the third communication band is a frequency band located between the first communication band and the second communication band, and is contiguous with or partially overlaps the second communication band,
the switch module is configured to switch between a first state in which the first connection and the second connection are simultaneously established and the third connection is not established and a second state in which the third connection is established and the first connection and the second connection are not established, and
when the switch module is in the first state, a first circuit, which includes the third selection terminal, the first impedance matching network, and the third filter, establishes an attenuation pole in the frequency band of the second communication band in a transmission characteristic of a path connecting the second filter, the second selection terminal, the common terminal, the first selection terminal, and the first filter to each other.
2. The front-end module according to claim 1,
wherein the switch module additionally has a fourth selection terminal and switches the first connection, the second connection, the third connection, and a fourth connection between the common terminal and the fourth selection terminal,
the front-end module further comprising:
a second impedance matching network that is connected to a path connected between the fourth selection terminal and ground.
3. The front-end module according to claim 2,
wherein when the switch module is in the first state, the first connection and the second connection are simultaneously established and the third connection and the fourth connection are not established, and
when the switch module is in the second state, the third connection and the fourth connection are established and the first connection and the second connection are not established.
4. The front-end module according to claim 2,
wherein when the switch module is in the second state, a second circuit, which includes the fourth selection terminal and the second impedance matching network, eliminates the attenuation pole in the frequency band of the second communication band in a transmission characteristic of the first circuit or shifts the attenuation pole to a band other than the third communication band.

5. The front-end module according to claim 3, wherein when the switch module is in the second state, a second circuit, which includes the fourth selection terminal and the second impedance matching network, eliminates the attenuation pole in the frequency band of the second communication band in a transmission characteristic of the first circuit or shifts the attenuation pole to a band other than the third communication band.

6. The front-end module according to claim 1, wherein when the switch module is in the first state, the second selection terminal and the third selection terminal are capacitively coupled to each other.

7. The front-end module according to claim 2, wherein when the switch module is in the first state, the second selection terminal and the third selection terminal are capacitively coupled to each other.

8. The front-end module according to claim 1, wherein a distance between the second selection terminal and the third selection terminal is smaller than a distance between the common terminal and the second selection terminal.

9. The front-end module according to claim 2, wherein a distance between the second selection terminal and the third selection terminal is smaller than a distance between the common terminal and the second selection terminal.

10. The front-end module according to claim 1, wherein the first filter includes:
  a first transmission filter that has an output terminal connected to the first selection terminal and that allows a radio-frequency signal of a transmission band of the first communication band to pass therethrough and
  a first reception filter that has an input terminal connected to the first selection terminal and that allows a radio-frequency signal of a reception band of the first communication band to pass therethrough;
the second filter includes:
  a second transmission filter that has an output terminal connected to the second selection terminal and that allows a radio-frequency signal of a transmission band of the second communication band to pass therethrough and
  a second reception filter that has an input terminal connected to the second selection terminal and that allows a radio-frequency signal of a reception band of the second communication band to pass therethrough, wherein:
the third filter is a reception filter having the third communication band as a reception band, and
when the switch module is in the first state, the first circuit generates an attenuation pole in the reception band of the second communication band in a transmission characteristic of a path connecting the second reception filter, the second selection terminal, the common terminal, the first selection terminal, and the first transmission filter to each other or generates an attenuation pole in the transmission band of the second communication band in a transmission characteristic of a path connecting the second transmission filter, the second selection terminal, the common terminal, the first selection terminal, and the first reception filter to each other.

11. The front-end module according to claim 2, wherein the first filter includes:
  a first transmission filter that has an output terminal connected to the first selection terminal and that allows a radio-frequency signal of a transmission band of the first communication band to pass therethrough and
  a first reception filter that has an input terminal connected to the first selection terminal and that allows a radio-frequency signal of a reception band of the first communication band to pass therethrough;
the second filter includes:
  a second transmission filter that has an output terminal connected to the second selection terminal and that allows a radio-frequency signal of a transmission band of the second communication band to pass therethrough and
  a second reception filter that has an input terminal connected to the second selection terminal and that allows a radio-frequency signal of a reception band of the second communication band to pass therethrough, wherein:
the third filter is a reception filter having the third communication band as a reception band, and
when the switch module is in the first state, the first circuit generates an attenuation pole in the reception band of the second communication band in a transmission characteristic of a path connecting the second reception filter, the second selection terminal, the common terminal, the first selection terminal, and the first transmission filter to each other or generates an attenuation pole in the transmission band of the second communication band in a transmission characteristic of a path connecting the second transmission filter, the second selection terminal, the common terminal, the first selection terminal, and the first reception filter to each other.

12. The front-end module according to claim 10, further comprising:
  a first low-noise amplifier that is connected to an output terminal of the first reception filter and that amplifies a reception signal of the first communication band; and
  a second low-noise amplifier that is connected to an output terminal of the second reception filter and that amplifies a reception signal of the second communication band;
wherein an input terminal of the third filter is connected to the first impedance matching network, and
an output terminal of the third filter is connected to the first low-noise amplifier or the second low-noise amplifier.

13. The front-end module according to claim 12, further comprising:
  a first switch that is arranged along a path connecting the first reception filter and the first low-noise amplifier to each other and that switches between connecting and disconnecting the first reception filter and the first low-noise amplifier to and from each other, and
  a second switch that is arranged along a path connecting the second reception filter and the second low-noise amplifier to each other and that switches a connection between the second reception filter and the second low-noise amplifier and a connection between the third filter and the second low-noise amplifier.

14. The front-end module according to claim 1, wherein the first communication band is Band 3 (transmission band: 1710-1785 MHz, reception band: 1805-1880 MHz) of Long Term Evolution (LTE), the second communication band is Band 1 (transmission band: 1920-1980 MHz, reception band: 2110-2170 MHz) of LTE, and the third communication band is Band 39 (reception band: 1880-1920 MHz) of LTE.

15. The front-end module according to claim 2, wherein the first communication band is Band 3 (transmission band: 1710-1785 MHz, reception band: 1805-1880 MHz) of Long Term Evolution (LTE), the second communication band is Band 1 (transmission band: 1920-1980 MHz, reception band: 2110-2170 MHz) of LTE, and the third communication band is Band 39 (reception band: 1880-1920 MHz) of LTE.

16. A front-end module comprising:

a switch module that has a common terminal, a first selection terminal, a second selection terminal, and a third selection terminal, and that switches a first connection between the common terminal and the first selection terminal, a second connection between the common terminal and the second selection terminal, and a third connection between the common terminal and the third selection terminal;

a first filter that is connected to the first selection terminal and that allows a radio-frequency signal of a first communication band to pass therethrough;

a second filter that is connected to the second selection terminal and that allows a radio-frequency signal of a second communication band to pass therethrough;

a first impedance matching network that is connected to the third selection terminal; and a third filter that is connected to the first impedance matching network and that allows a radio-frequency signal of a third communication band to pass therethrough;

wherein the second communication band is a frequency band that is different from the first communication band, the third communication band is a frequency band located between the first communication band and the second communication band, and that is contiguous with or partially overlaps the second communication band, the switch module is configured to switch between a first state in which the first connection and the second connection are simultaneously established and the third connection is not established and a second state in which the third connection is established and the first connection and the second connection are not established, and when the switch module is in the first state, the second selection terminal and the third selection terminal are capacitively coupled with each other.

17. A communication device comprising:

an RF signal processing circuit that processes radio-frequency signals transmitted or received by an antenna element; and the front-end module according to claim 1, which transmits the radio-frequency signals between the antenna element and the RF signal processing circuit.

18. A communication device comprising:

an RF signal processing circuit that processes radio-frequency signals transmitted or received by an antenna element; and the front-end module according to claim 2, which transmits the radio-frequency signals between the antenna element and the RF signal processing circuit.

19. A communication device comprising:

an RF signal processing circuit that processes radio-frequency signals transmitted or received by an antenna element; and the front-end module according to claim 6, which transmits the radio-frequency signals between the antenna element and the RF signal processing circuit.

20. A communication device comprising:

an RF signal processing circuit that processes radio-frequency signals transmitted or received by an antenna element; and the front-end module according to claim 16, which transmits the radio-frequency signals between the antenna element and the RF signal processing circuit.

* * * * *